F. STREICH.
DOUGH MOLDING MACHINE.
APPLICATION FILED MAR. 20, 1916.

1,216,512.

Patented Feb. 20, 1917.

3 SHEETS—SHEET 3.

ated Feb. 20, 1917.
UNITED STATES PATENT OFFICE.

FRANK STREICH, OF JOLIET, ILLINOIS, ASSIGNOR TO THE UNION WRAPPING MACHINE COMPANY, OF JOLIET, ILLINOIS, A CORPORATION OF ILLINOIS.

DOUGH-MOLDING MACHINE.

1,216,512.
Specification of Letters Patent. Patented Feb. 20, 1917.

Application filed March 20, 1916. Serial No. 85,239.

*To all whom it may concern:*

Be it known that I, FRANK STREICH, a citizen of the United States, and a resident of Joliet, county of Will, and State of Illinois, have invented certain new and useful Improvements in Dough-Molding Machines, of which the following is declared to be a full, clear, and exact description.

This invention relates to dough molding machines, and its primary object is to improve upon the construction and operation of machines of this class. The invention has particular reference to that type of dough molding machines, that employ rotating cylindrical bodies for curling or coiling a sheet of dough, and thereafter rolling and compressing it into loaf form. Heretofore much difficulty has been encountered in the curling mechanism, and many unsuccessful attempts have been made to remedy this difficulty. I have overcome the obstacles in the present invention as embodied in the machine shown and described herein. The invention, therefore, consists, in the several novel features hereinafter fully set forth and claimed.

The invention is clearly illustrated in the accompanying drawings, in which:—

Figure 1:
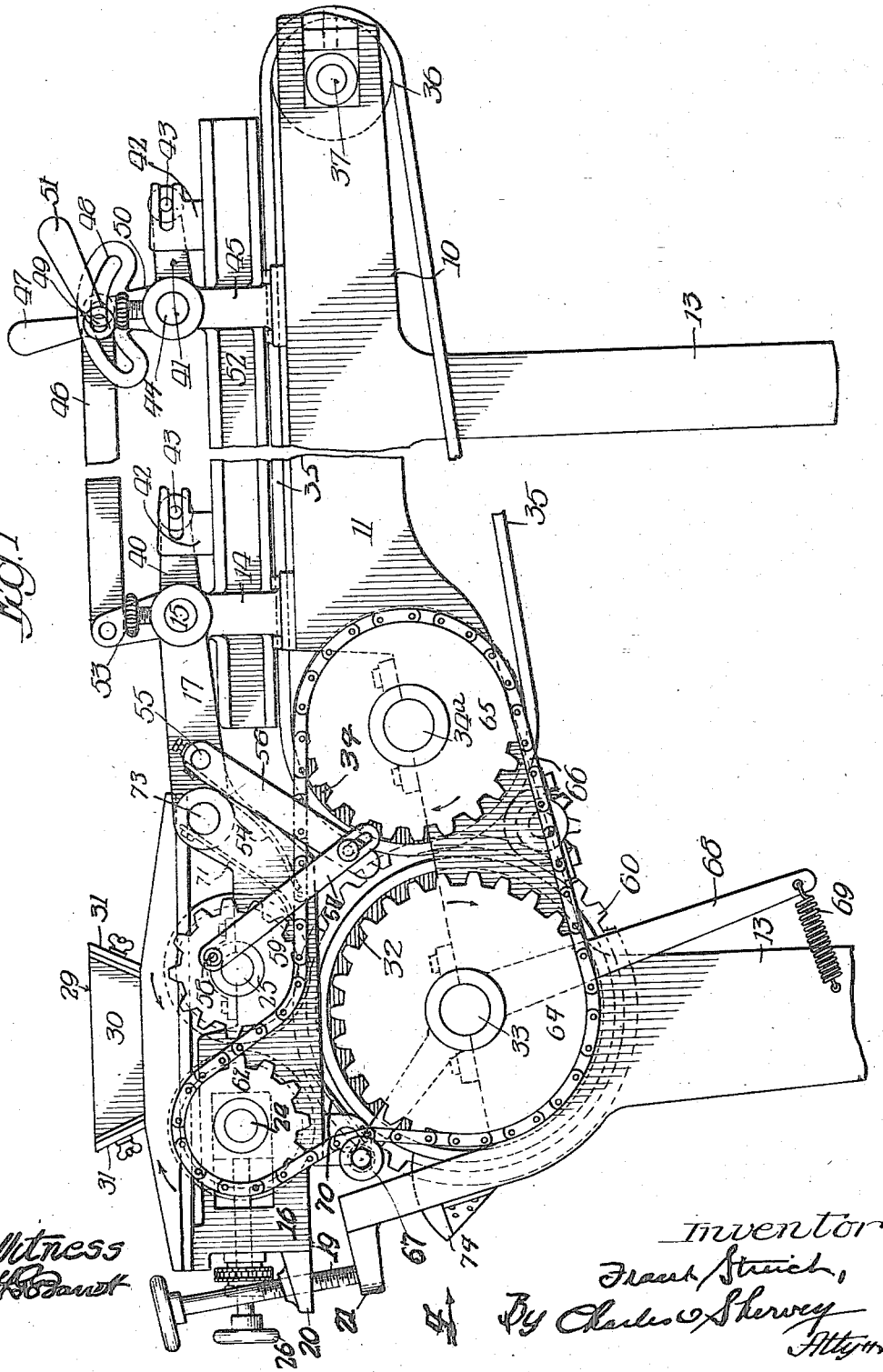
Figure 2:
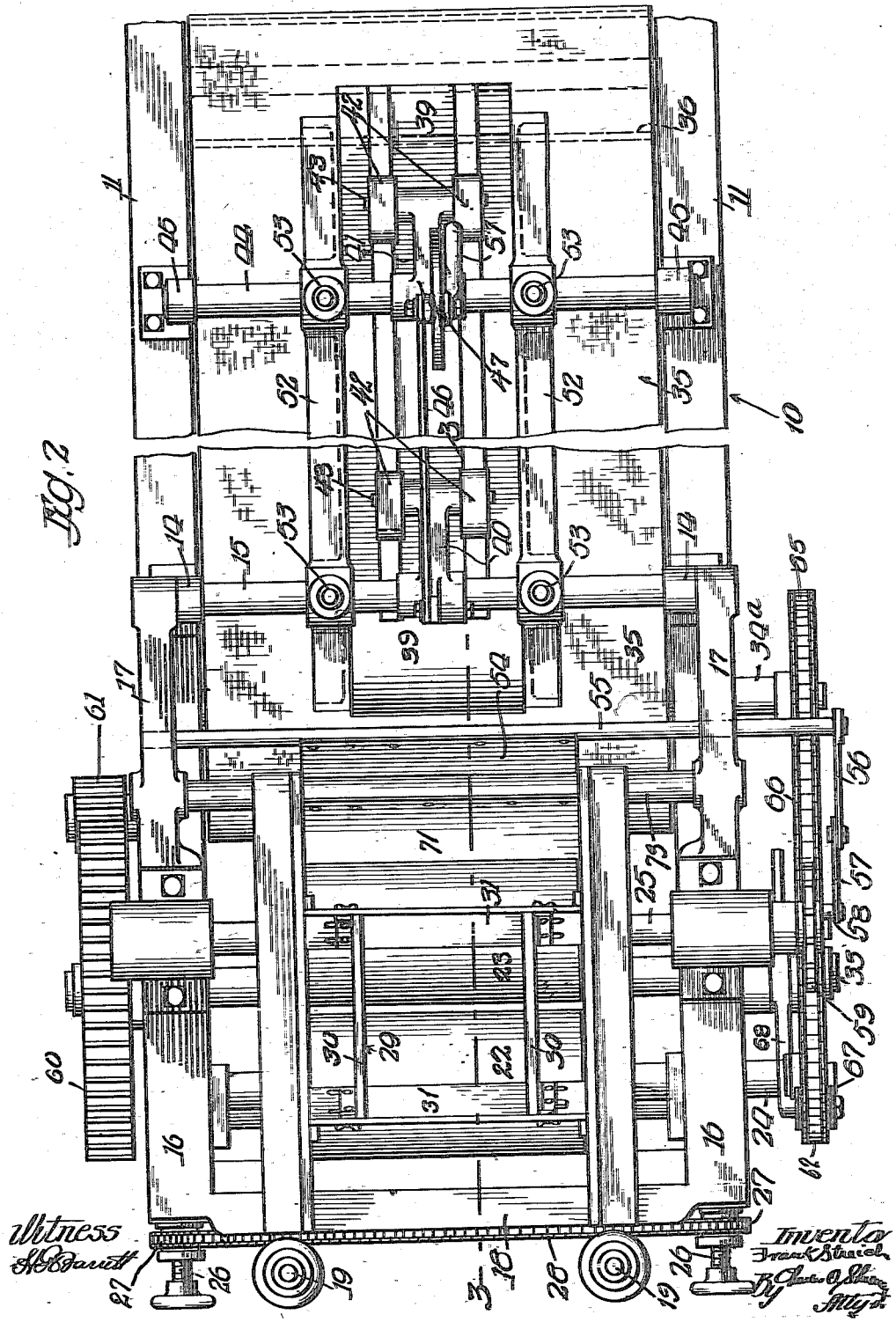
Figure 3:
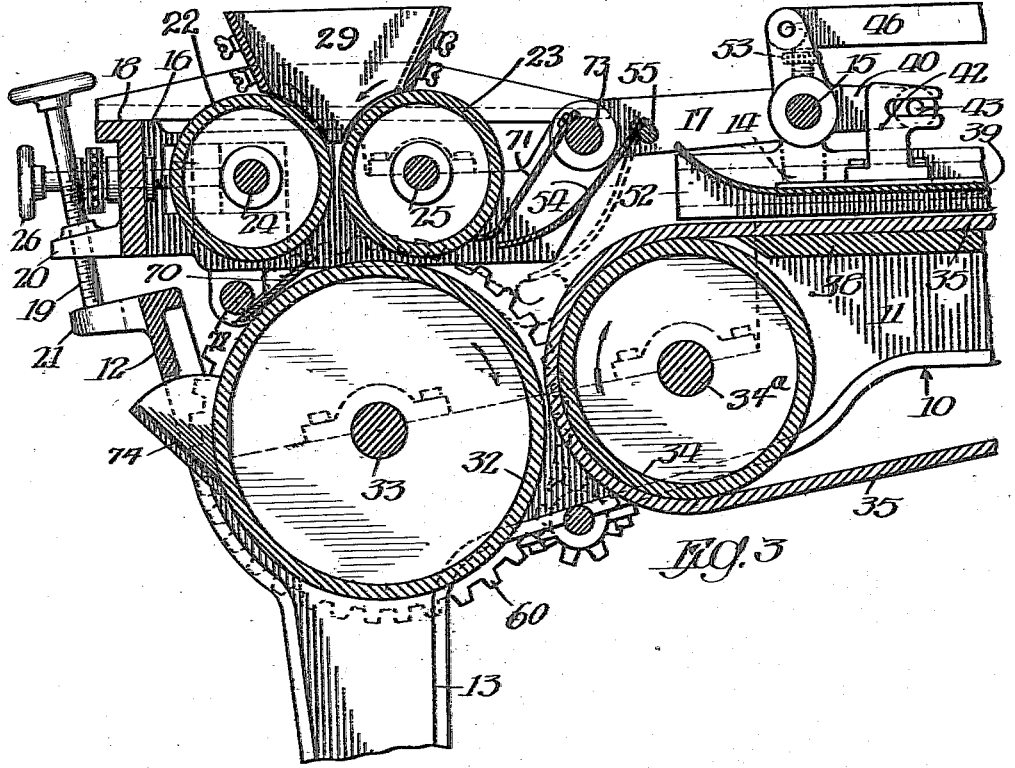
Figure 4:
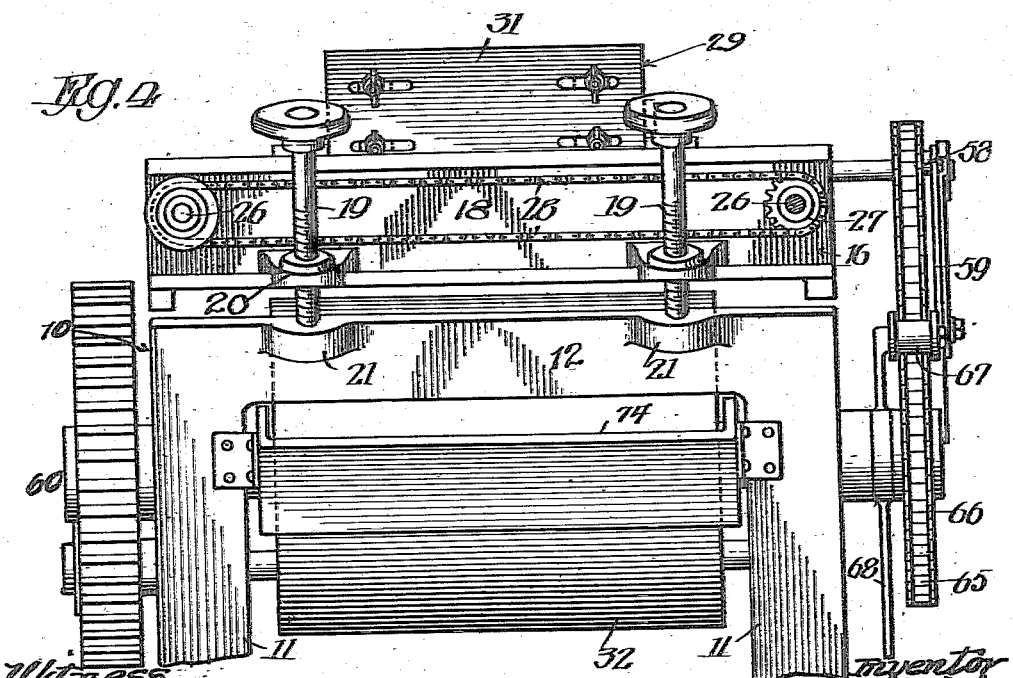

Figure 1, is a side elevation, partly broken away, of a dough molding machine, embodying a simple form of the present invention; Fig. 2, is a plan thereof; Fig. 3, is a vertical, longitudinal section taken on the line 3—3 of Fig. 2, and Fig. 4 is an end view of the machine, looking in the direction of the arrow 4, in Fig. 1.

Referring to said drawings, the reference numeral 10, designates a supporting frame of strong and substantial construction, said frame comprising, in general, in two side frame members 11, 11, cross members 12 and legs 13. Secured to the side frame members 11, near one end of the machine are posts or standards 14, in which is mounted a rod 15, which carries one end of a rocking feed roll carrying frame 16, which as shown, comprises two side members 17, and a cross member 18. The side members 17, are carried by the rod 15, and the cross member 18, is supported upon the cross member 12, of the main frame, by two adjustment screws 19, which are threaded in ears 20, that project out from the cross member 18, the screws rest on lugs 21, formed on the cross member 12, of the main frame.

Journaled upon the side members of the rocking frame 16, are two feed rollers 22, 23, which are arranged side by side, and mounted upon shafts 24, 25, that are journaled in bearing boxes on the side members 17, one pair of boxes being adjustably mounted on the side members, and adjustment screws 26, threaded in the cross member 18, being employed for effecting the adjustment of the roller 22. Sprocket wheels 27, secured upon the adjustment screws 26, and a sprocket chain 28, trained around said sprocket wheels, are provided for effecting simultaneous rotation of both adjustment screws, whenever one is turned, to thereby change the location of the roll 22.

Above the feed rolls 22, 23, is a hopper 29, which is mounted on the rocking frame 16, and has transversely adjustable side boards 30, adjustably mounted on inclined boards 31. In the operation of the machine, the lumps of dough are dropped into the hopper 29, and onto the feed rolls 22, 23, between which they are compressed and fed to the sheeting roll as will appear later.

Below the feed rolls 22, 23, is a sheeting roll 32, which is of a larger diameter than either feed roll, but driven at or approximately at the same peripheral speed, and said sheeting roll 32, is mounted on a shaft 33, journaled in bearing boxes mounted on the side frame members 11. At the side of the sheeting roll 32, is a pulley 34, around which pulley is an apron or belt 35, of canvas or the like, which runs to and is trained around a pulley 36, mounted on a shaft 37, which is journaled in bearing boxes adjustably mounted on the side frame members 11, at one end of the machine. The upper portion of the apron runs on a table or platform 38, which is supported by the side members of the frame 10, and above said belt is a vertically adjustable pressure plate 39, which is supported from two bell crank levers 40, 41, by posts 42, that are secured to the pressure plate and have horizontal slots in their upper ends into which project pins 43, of the bell crank levers 40, 41. The bell crank lever 40, is mounted on the rod 15, and the bell crank lever 41, is mounted on a rod 44, which is secured in posts 45, secured to and extending up from the side frame members 11. The horizontal arms of the bell crank levers connect with the pressure plate or board as described, and the vertical arms of said levers are connected together by a link 46, to maintain parallelism between the pressure plate and apron at all points of adjustment of the pressure plate. A handle 47, on the upper end of the vertical arm of the bell crank lever 41, furnishes means whereby the pressure board may be raised or lowered by hand. A post 50, secured to the rod 44, is provided with a segmental slot 48, through which projects a screw threaded pin 49, carried by the bell crank lever 41, and a screw threaded clamp nut 51, is threaded on said pin 49, and adapted, when screwed up against the post, to lock the bell crank lever and pressure board in any position of adjustment.

Extending along each side edge of the pressure board or plate 39, is a side board or plate 52, which is carried by the rods 15, 44, that extend through boxes formed upon the upper edges of the side plates; set screws 53, threaded in said boxes and adapted to bear upon said rods furnish means for adjustably clamping the side plates in place. The apron or belt 35, pressure plate 39, and side plates 52, provide a channel or conduit whose cross sectional area may be increased or decreased for different sized loaves.

The sheeting roll 32, and belted pulley 34, form a crotch or pocket into which the sheets of dough are carried by the sheeting roll 32, the sheet of dough is thereby carried against the face of the apron or belt 35, and curled upward and back into the form of a coil. To insure the coiling or curling up of the sheets of dough, I have provided a kneader 54, above the crotch or pocket between the sheeting roll 32, and pulley 34, which kneader is in the form of a curved plate, carried by a rock shaft 55, journaled in the side members 17, of the frame 16. A rocker arm 56, is secured upon one end of the rock shaft 55, and is connected by a link 57, to an eccentric pin 58, on a roll driving sprocket wheel 59, the arrangement being such that the kneading plate is rocked back and forth once during each revolution of the sprocket wheel 59. The effect is that, from the time the belted pulley 34, begins to curl up the dough, it is kneaded down against the belted pulley 34, and temporarily held back from rising and following said pulley in the form of a sheet, but is effectively curled or coiled up before it is carried under the upturned end of the pressure board 39, under which it is rolled by the belt until it emerges at the discharge end, in the form of a loaf.

Any suitable gearing may be employed for driving the rolls and pulleys, and in the simple form illustrated, a gear wheel 60, is shown fast upon the shaft 33, which gear wheel may be driven from a motor or from any other suitable source of power as desired. The roll shafts 24, 25, 33 and pulley shaft 34$^a$, have sprocket wheels 62, 59, 64, 65, secured thereon, and a sprocket chain 66, is trained around them as shown in Fig. 1, whereby the several rolls and pulley are driven in the directions of the arrows. A tension idler 67, carried by a lever 68, is pressed against the chain 66, by a spring 69, secured to one of the legs 13, of the main frame. The slack in the chain is thereby taken up and the feed roll carrying frame permitted to rise without unnecessarily tightening the chain upon the sprocket wheels. The gearing is timed to drive the feed rolls, sheeting roll and belt pulley at or approximately at the same peripheral speed. Scrapers 70, 71, are secured to rods 72, 73, supported by the roll carrying frame 16, and engage the feed rolls as shown to scrape off any flour or dough that may accumulate thereon. A flour hopper 74, is mounted back of the sheeting roll, and supplies said roll with flour.

In the operation of the machine lumps of dough are dropped into the hopper 29, one at a time, and fall between the feed rolls 22, 23, which compress and force the lumps of dough down upon the sheeting roll 32, which in turn carries it under the feed roll 23, where it is flattened out in the form of a sheet of dough, and carried toward and against the apron around the pulley 34, which revolves in the same direction as the sheeting roll and curls or coils the sheet upon itself, the kneading plate 54, at the same time kneading the coil (as it is being formed) down upon the belted pulley 34, and as the coil is completed it is rolled up along the lower side of the kneading plate until it reaches the pressure board 39, under which it is rolled in a compressed condition, until it emerges in the form of a completed loaf at the discharge end.

In case the dough is hard, or in case a hard lump of dough passes between the feed roll 23, and the sheeting roll 32, the roll carrying frame is thereby raised slightly, thereby preventing any excessive compressing of the dough. Furthermore, the oscillating kneader insures the coiling or curling up action and the adjustable pressure board provides means for effecting the proper pressure on the coil to produce a perfect loaf.

I am aware that various alterations and modifications of this machine are possible without departing from the spirit of this invention; I desire, therefore, not to limit myself to the exact form of the invention shown and described, but intend in the following claims to point out all of the invention disclosed herein.

I claim as new and desire to secure by Letters Patent,

1. A dough molding machine, comprising a rotatory roll, and a belted pulley adjacent thereto, and rotating in the same direction, there being a crotch therebetween, in which dough is curled, a kneading plate adjacent the crotch, and means for oscillating said kneading plate into pressing contact with the dough.

2. A dough molding machine, comprising a rotatory roll, and a belted pulley adjacent thereto, and rotating in the same direction, there being a crotch therebetween, in which the dough is curled, an oscillating kneading plate adjacent said crotch extending over said belted pulley and forming a pressure plate under which the curled dough is rolled, and means for oscillating said kneading plate.

3. A dough molding machine, comprising two rotating dough curling members, traveling in the same direction and having a crotch therebetween, in which the dough is curled, and an oscillatory dough kneading plate adjacent said crotch arranged to knead the dough against one of the rotating members.

4. A dough molding machine, comprising a feed roll, a sheeting roll rotating in the opposite direction, a belted pulley adjacent the sheeting roll and rotating in the same direction, there being a crotch therebetween, a dough kneading plate adjacent the crotch, and operative connections between the feed roll and dough kneading plate for oscillating the same, and thereby knead the dough against the belted pulley.

5. A dough molding machine, comprising a rotary roll, a belted pulley adjacent thereto and rotating in the same direction, there being a crotch therebetween, in which the dough is curled, and an oscillatory kneading plate at the crotch, between which plate and the belted pulley, the dough is rolled.

6. In a dough molding machine, a main frame, an endless traveling apron, a pressure board thereabove, posts secured to and extending up from said pressure board, each post having a horizontal notch formed near its upper end, bell crank levers supported by said main frame and having pins extending into said notches and pivotally connecting the bell crank levers with said posts, a link connecting said bell crank levers, and clamping means on one of said bell crank levers for securing them in any position of adjustment.

7. In a dough molding machine, a main frame, an endless traveling apron, a pressure board thereabove, posts secured to and projecting up from said pressure board, cross rods supported upon said frame, bell crank levers rotatively mounted on said rods and detachably connected to said posts, a link connecting said bell crank levers, clamping means on one of said bell crank levers for securing said bell crank levers, and therewith the pressure board, in any position of adjustment, and side boards secured upon said rods and extending along said pressure board.

8. In a dough molding machine, a frame, feed rolls rotating in opposite directions, a sheeting roll therebelow, a curling roll at the sides of said sheeting roll, and an endless traveling apron trained over said curling roll, all carried by the frame, a hopper above the feed rolls, having laterally adjustable side walls located above said feeding rolls, a pressure board supported above the traveling apron, and laterally adjustable side boards supported along the sides of the pressure board.

FRANK STREICH.